US010609564B2

United States Patent
Kim

(10) Patent No.: US 10,609,564 B2
(45) Date of Patent: Mar. 31, 2020

(54) SYSTEM AND METHOD FOR DETECTING ROGUE ACCESS POINT AND USER DEVICE AND COMPUTER PROGRAM FOR THE SAME

(71) Applicant: Seedgen co., ltd., Seoul (KR)

(72) Inventor: Hui-young Kim, Seoul (KR)

(73) Assignee: Seedgen Co., Ltd., Seoul (KR)

( * ) Notice: Subject to any disclaimer, the term of this patent is extended or adjusted under 35 U.S.C. 154(b) by 196 days.

(21) Appl. No.: 15/711,080

(22) Filed: Sep. 21, 2017

(65) Prior Publication Data

US 2019/0036951 A1   Jan. 31, 2019

(30) Foreign Application Priority Data

Jul. 28, 2017   (KR) .......................... 10-2017-0096280

(51) Int. Cl.
*H04W 12/12* (2009.01)
*H04L 29/06* (2006.01)
*H04W 12/06* (2009.01)

(52) U.S. Cl.
CPC ..... *H04W 12/1202* (2019.01); *H04L 63/0823* (2013.01); *H04L 63/1425* (2013.01); *H04L 63/168* (2013.01); *H04W 12/06* (2013.01)

(58) Field of Classification Search
CPC .............................................. H04W 12/1202
See application file for complete search history.

(56) References Cited

U.S. PATENT DOCUMENTS

| | | | |
|---|---|---|---|
| 7,570,625 B1 * | 8/2009 | Ocepek | H04L 63/1441 370/310 |
| 7,676,218 B2 * | 3/2010 | Ballai | H04L 63/10 455/411 |
| 9,544,798 B1 * | 1/2017 | Ahmadzadeh | H04W 24/08 |
| 9,882,931 B1 * | 1/2018 | Harmon | H04L 63/1483 |
| 9,913,201 B1 * | 3/2018 | Harmon | H04W 48/04 |
| 2006/0193258 A1 * | 8/2006 | Ballai | H04L 63/10 370/230 |

(Continued)

FOREIGN PATENT DOCUMENTS

| | | |
|---|---|---|
| KR | 20130057678 | 6/2013 |
| KR | 101537800 | 7/2015 |
| KR | 101606352 | 3/2016 |

*Primary Examiner* — Bradley W Holder

(74) *Attorney, Agent, or Firm* — Fish & Richardson P.C.

(57) ABSTRACT

A system for detecting a rogue access point (AP) may include: a user device configured to detect whether an accessed AP is a rogue AP with reference to a rogue AP database based on uniform resource locator (URL) access detection, and determine whether the accessed AP is a rogue AP by further using one or more information of secure sockets layer (SSL) certificate validity information of a predetermined server, electronic signature information of an accessed web page, and media access control (MAC) address collection information of an accessed gateway, if information of the accessed AP is not searched in the rogue AP database; and a detection server configured to share the rogue AP database with the user device. Using the system for detecting a rogue AP, it is possible to detect existence of a rogue AP having an unknown form through access detecting using a one-time URL, and detect address resolution protocol (ARP) spoofing attack.

1 Claim, 5 Drawing Sheets

(56) References Cited

U.S. PATENT DOCUMENTS

| | | | |
|---|---|---|---|
| 2008/0195866 A1* | 8/2008 | Roth | H04W 12/12 |
| | | | 713/171 |
| 2011/0162060 A1* | 6/2011 | Vijayakumar | H04L 12/413 |
| | | | 726/13 |
| 2012/0246510 A1* | 9/2012 | Kojina | G06F 13/4282 |
| | | | 714/4.5 |
| 2013/0019298 A1* | 1/2013 | Jover Segura | H04L 63/101 |
| | | | 726/7 |
| 2013/0227645 A1* | 8/2013 | Lim | H04L 63/1433 |
| | | | 726/3 |
| 2014/0199664 A1* | 7/2014 | Sadeh-Koniecpol | G09B 5/00 |
| | | | 434/118 |
| 2015/0133148 A1* | 5/2015 | Yang | H04W 64/00 |
| | | | 455/456.1 |
| 2016/0277427 A1* | 9/2016 | Deshpande | H04L 63/1416 |
| 2017/0026859 A1* | 1/2017 | Ahmadzadeh | H04W 24/08 |
| 2017/0103674 A1* | 4/2017 | Sadeh-Koniecpol | G06F 21/55 |
| 2018/0219885 A1* | 8/2018 | Ahmadzadeh | H04L 63/1408 |

\* cited by examiner

SYSTEM AND METHOD FOR DETECTING ROGUE ACCESS POINT AND USER DEVICE AND COMPUTER PROGRAM FOR THE SAME

RELATED APPLICATIONS

This application claims priority to Korean Patent Application No. 10-2017-0096280, filed on Jul. 28, 2017 in the Korean Intellectual Property Office, the entire disclosure of which is incorporated herein by reference.

BACKGROUND OF THE INVENTION

1. Field of the Invention

Embodiments relate to a system and a method for detecting a rogue access point (AP) and a user device and a computer program for the same.

2. Description of the Related Art

In accordance with development of a short-range wireless technology and wireless equipment, a speed and availability of a wireless network have been improved, and as a price and a size of equipment are gradually decreased, a range of use of the wireless network is rapidly expanding from households to companies. Recently, due to distribution of smartphones, an access point (AP) through Wi-Fi is provided using a router in various places such as households, public places, companies, etc., and a communication trend is rapidly changing from the existing wired network to a wireless network.

However, the wireless network has many weak points due to characteristics of a service that uses air as a transmission medium, and as the wireless network emerges as an importance communication means in real life, security problems threatening wireless communication technologies become a threat to living environment. Attacks on the wireless communication include unauthorized rogue AP attack, communication intercept, denial of service (Do's) attack, man-in-the-middle attack and the like. In particular, the rogue AP attack in which an attacker such as a hacker may pretend to be a normal AP in the network and the surrounding normal users may be deceived is the most threatening security problem.

FIG. 1A is a conceptual diagram illustrating a normal AP connection state, and FIG. 1B is a conceptual diagram illustrating a rogue AP connection state.

Referring to FIG. 1A, in the normal connection state, a user device 1 such as a smartphone, a tablet PC, or the like communicates with an AP 2 using a wireless local area network (LAN) signal such as Wi-Fi, thereby performing communication with an external server 3 via Internet. However, referring to FIG. 1B, when a rogue AP 2' pretending to be a normal AP using a wireless notebook having two wireless interfaces and the like exists, a wireless LAN area of the normal AP 2 is maliciously expanded through the rogue AP 2'. If a user transmits data without knowing that access to the rogue AP 2' is made, an attacker may take the data of the user toward the normal AP 2 through the rogue AP 2'. However, it is not easy for a general user to detect whether the rogue AP 2' is installed or an accurate location.

In order to solve the above described problems, products such as a wireless intrusion prevention system (WIPS) or a network access control (NAC) capable of detecting the rogue AP by constructing a solution in an internal network of a company, or the like to build a database of information on network equipment have been developed. However, in a case of the products, a separate sensor or network equipment needs to be installed in the internal network in advance, thus it is impossible to be applied to mobile locations such as a computer or a mobile device of an individual user, not the network environment previously defined.

SUMMARY OF THE INVENTION

It is an object of the present invention to provide a system and a method for detecting a rogue AP capable of easily detecting whether a currently accessed access point (AP) is a rogue AP in a user device to facilitate the use by general individual users who use a wireless network in households or public places, and capable of coping with an unknown type of attack, and a user device and a computer program for the same.

According to one embodiment of the present invention, there is provided a system for detecting a rogue access point (AP) including: a user device configured to detect whether an accessed AP is a rogue AP with reference to a rogue AP database based on uniform resource locator (URL) access detection, and determine whether the accessed AP is a rogue AP by further using one or more information of secure sockets layer (SSL) certificate validity information of a predetermined server, electronic signature information of an accessed web page, and media access control (MAC) address collection information of an accessed gateway, if information of the accessed AP is not searched in the rogue AP database; and a detection server configured to share the rogue AP database with the user device.

In one embodiment, the detection server may be further configured to generate the rogue AP database based on access log information generated by attempts of access by a plurality of devices to the detection server using a one-time URL corresponding to the devices and APs to which the devices access In one embodiment, the user device may be further configured to attempt access to the detection server using a one-time URL including information of the user device and information of the AP to which the user device accesses for generation of the rogue AP database.

In one embodiment, the user device may be further configured to collect MAC addresses of the gateway to which the user device accesses, and determine that the currently accessed AP is a rogue AP if a plurality of same MAC addresses are collected in a broadcasting domain.

The user device having a rogue AP detection function according to one embodiment may include a communication module configured to transmit and receive data by accessing an AP and receive a rogue AP database based on URL access detection from a detection server; and a detection module configured to detect whether the AP to which the user device accesses is a rogue AP with reference to the rogue AP database, and determine whether the accessed AP is a rogue AP by further using one or more information of SSL certificate validity information of a predetermined server, electronic signature information of an accessed web page, and MAC address collection information of a gateway, if information of the accessed AP is not searched in the rogue AP database.

In one embodiment, the communication module may be further configured to attempt access to the detection server using a one-time URL including information of the user device and information of the AP to which the user device accesses for generation of the rogue AP database.

In one embodiment, the detection module may be further configured to collect MAC addresses of the accessed gateway, and determine that the accessed AP is a rogue AP if a plurality of same MAC addresses are collected in a broadcasting domain.

In one embodiment, the detection module may be further configured to attempt SSL connection to the predetermined server and determine that the accessed AP is a rogue AP if the SSL connection to the predetermined server fails or the SSL certificate validity of the predetermined server is not verified.

In one embodiment, the detection module may be further configured to store an address of a preset web page and an electronic signature of the web page, download the preset web page through the accessed AP, and determine that the accessed AP is a rogue AP if the electronic signature of the downloaded web page does not coincide with the stored electronic signature.

The detection server for rogue AP detection according to one embodiment may include a web server configured to generate access log information corresponding to a result of an access attempt by a plurality of devices to the web server using a one-time URL corresponding to the devices and the APs to which the devices access; a database management system configured to generate a URL access detection-based rogue AP database on the basis of the access log information; and a communication server configured to provide the rogue AP database to the user device.

In one embodiment, the database management system may be further configured to generate the rogue AP database by searching a record of a plurality of access using the one-time URL in the access log information.

According to another embodiment of the present invention, there is provided a method for detecting a rogue AP including: accessing, by a user device to an AP; receiving, by the user device, a rogue AP database based on URL access detection from a detection server; detecting, by the user device, whether the AP to which the user device accesses is a rogue AP with reference to the rogue AP database; and determining whether the accessed AP is a rogue AP by further using one or more information of SSL certificate validity information of a predetermined server, electronic signature information of an accessed web page, and MAC address collection information of a gateway, if information of the accessed AP is not searched in the rogue AP database.

The method for detecting a rogue AP according to one embodiment may further include attempting, by the user device, access to the detection server using a one-time URL including information of the user device and information of the AP to which the user device accesses for generation of the rogue AP database.

In one embodiment, the determining of whether the accessed AP is a rogue AP may include: collecting MAC addresses of the gateway to which the user device accesses; and determining that the accessed AP is a rogue AP if a plurality of same MAC addresses are collected in a broadcasting domain.

In one embodiment, the determining of whether the accessed AP is a rogue AP may include: attempting, by the user device, SSL connection to the predetermined server; and determining that the accessed AP is a rogue AP if the SSL connection to the predetermined server fails or the SSL certificate validity of the predetermined server is not verified.

In one embodiment, the user device may store an address of a preset web page and an electronic signature of the web page, and the determining of whether the accessed AP is a rogue AP may include: downloading the preset web page through the accessed AP; and determining that the accessed AP is a rogue AP if the electronic signature of the downloaded web page does not coincide with the stored electronic signature.

According to another embodiment of the present invention, there is provided a method for detecting a rogue AP including: generating, by a detection server, access log information corresponding to a result of an access attempt by a plurality of devices to the detection server using a one-time URL corresponding to the devices and APs to which the devices access; generating, by the detection server, a URL access detection-based rogue AP database on the basis of the access log information; and providing, by the detection server, the rogue AP database to the user device.

In the method for detecting a rogue AP according to one embodiment, the generating of the rogue AP database may include generating the rogue AP database by searching a record of a plurality of access using the one-time URL in the access log information.

According to another embodiment of the present invention, there is provided a computer program for executing the method for detecting a rogue AP according to the embodiments described above with a combination with hardware, wherein the computer program is stored in a computer-readable medium.

According to the system and method for detecting a rogue AP in accordance with the aspects of the present invention, it is possible to detect existence of a rogue AP having an unknown form through access detecting using a one-time URL, and detect address resolution protocol (ARP) spoofing attack.

In addition, according to the system and method for detecting a rogue AP in accordance with the aspects of the present invention, it is possible to prevent personal information from being leaked by performing, by the user, rogue AP detection in a device such as a smartphone or a tablet PC of an individual user without an external device and an aid of other person and braking away from the existing method that requires an external device such as a sensor for detecting the rogue AP.

The wireless AP is essential for an era of Internet of things (IoT) in which an object and another object, and an object and a person in living environment are connected through wireless network to transmit and receive information. The technology for detecting a rogue AP according to an aspect of the present invention provides safe wireless network environment to contribute to activation of a terminal, platform, and service for IoT.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, exemplary embodiments of the present invention will be described in detail with reference to the accompanying drawings.

Figure 1A:
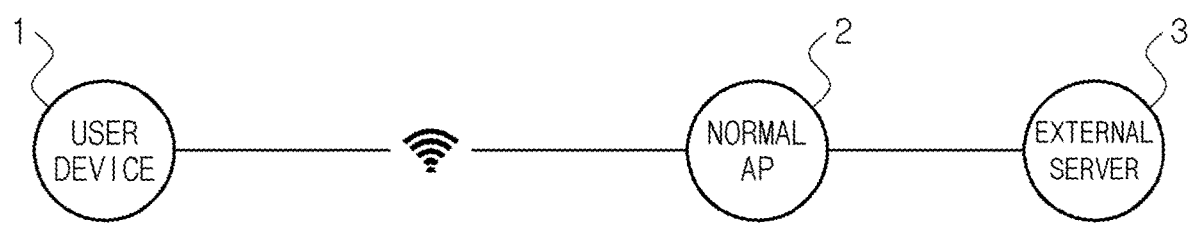
FIG. 1A is a conceptual diagram illustrating a normal access point (AP) connection state.
Figure 1B:
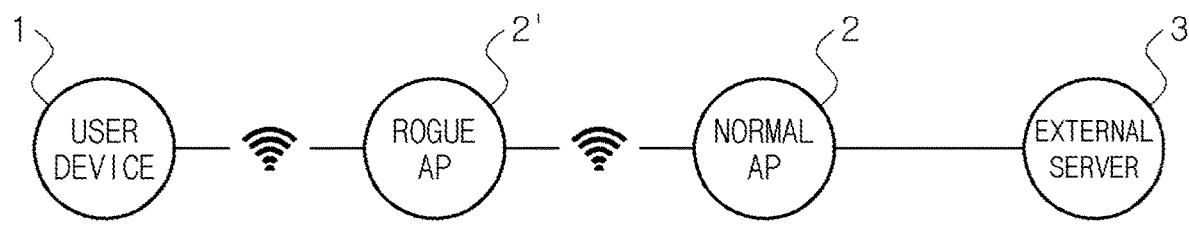
FIG. 1B is a conceptual diagram illustrating a rogue AP connection state.
Figure 2:
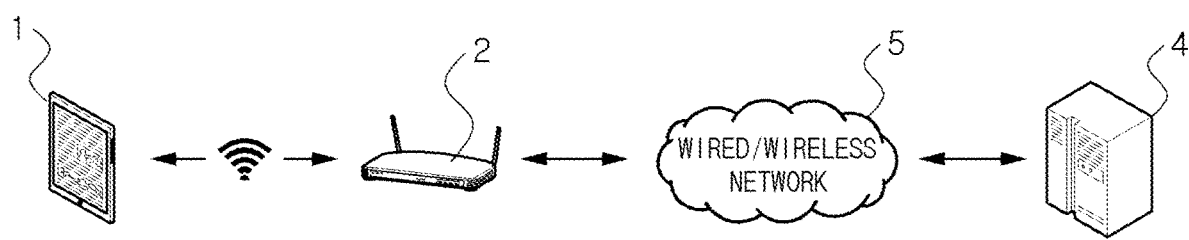
FIG. 2 is a conceptual diagram of a system for detecting a rogue AP according to the embodiment of the present invention.

FIG. 2 is a conceptual diagram of a system for detecting a rogue access point (AP) according to an embodiment of the present invention.

Referring to FIG. 2, the system for detecting a rogue AP according to the present embodiment includes a user device 1 and a detection server 4. The system for detecting a rogue AP according to the embodiments may take the form of entirely hardware or partially hardware and partially software. For example, the user device 1 and the detection server 4 may refer collectively to hardware and its related software for processing data of particular format and content and/or transmitting and receiving it by an electronic communication method. The term "unit", "module", "terminal", "device" or "system" as used herein is intended to refer to a combination of hardware and software that works by the corresponding hardware. For example, the hardware may be a data processing device including a central processing unit (CPU) or other processor. Furthermore, the software that works by the hardware may refer to a process being executed, an object, an executable, a thread of execution, and a program.

The user device 1 is communication-connected to a wired and/or wireless network 5 through an AP 2. The connection between the user device 1 and the AP 2 may be wireless connection. For example, the AP 2 may be a wired/wireless router that may generate a wireless local area network (LAN) signal such as Wi-Fi and the like, a notebook having a wireless LAN function, or the like, and the user device 1 accesses the AP 2 through the wireless LAN signal, thereby to perform communication through the wired and/or wireless network 5. Further, the user device 1 may be operated while communicating with the detection server 4 through the wired and/or wireless network 5.

The wired and/or wireless network 5 may be any network that enables networking between an entity and another entity through any communication method, without being limited to a particular communication scheme. For example, the wired and/or wireless network 5 may be a network that allows at least one communication method selected from the group consisting of Local Area Network (LAN), Metropolitan Area Network (MAN), Global System for Mobile Network (GSM), Enhanced Data GSM Environment (EDGE), High Speed Downlink Packet Access (HSDPA), Wideband Code Division Multiple Access (W-CDMA), Code Division Multiple Access (CDMA), Time Division Multiple Access (TDMA), Bluetooth, Zigbee, Wi-Fi, Voice over Internet Protocol (VoIP), LTE Advanced, IEEE802.16m, Wireless-MAN-Advanced, HSPA+, 3GPP Long Term Evolution (LTE), Mobile WiMAX (IEEE 802.16e), UMB (formerly EV-DO Rev. C), Flash-OFDM, iBurst and MBWA (IEEE 802.20) systems, HIPERMAN, Beam-Division Multiple Access (BDMA), World Interoperability for Microwave Access (Wi-MAX) and ultrasonic communication, but is not limited thereto.

The detection server 4 is configured to share a rogue AP database with the user device 1. In embodiments of the present invention, the rogue AP database is generated in the detection server 4 at least partially based on detection of uniform resource locator (URL) access, and is provided to the user device 1. A specific process of generating a rogue AP database using detection of URL access will be described in detail below with reference to FIG. 3.

Meanwhile, the detection server 4 may receive information on the AP 2 to which the user device 1 accesses from the user device 1 and determine whether the corresponding AP 2 is a rogue AP based on the received information. If the corresponding AP 2 is determined as a rogue AP, the detection server 4 may update the rogue AP database so as to reflect the corresponding result. Further, the detection server 4 provides the updated rogue AP database to the user device 1, thereby to prevent the user device 1 from accessing the rogue AP.

The user device 1 is a device used by a user who wants to perform detection of a rogue AP, and refers to any equipment accessible to the AP 2 through the wireless LAN. For example, the user device 1 may be a mobile communication terminal such as a smartphone, a personal computer, a notebook computer, a PDA, a tablet PC, or a set-top box for IPTV or the like, but it is not limited thereto. Further, the user device 1 may be operated using various operating systems (OSs), for example, using desktop computer operating systems such as Microsoft Windows, OS X, Linux, and the like, or mobile device operating systems such as an Apple iOS, Google Android, Windows Mobile, and the like, but it is not limited thereto.

The user device 1 is configured to share a rogue AP database with the detection server 4. Further, the user device 1 may update the rogue AP database, and the updated database may be synchronized between the user device 1 and the detection server 4. The synchronization of the rogue AP database may be automatically performed periodically and/or aperiodically, or may be manually performed corresponding to a user input using the user device 1.

The user device 1 may determine whether the currently accessed AP 2 is a rogue AP by searching the rogue AP database. For example, each AP 2 has unique service set identification (SSID) and basic service set identification (BSSID), and the rogue AP database may include the SSIDs and/or BSSIDs of APs that are previously determined as a rogue AP. The user device 1 may detect whether the currently accessed AP 2 is a rogue AP without a separate external device by searching whether the SSID or BSSID of the currently accessed AP 2 is included in the rogue AP database.

According to an embodiment, the rogue AP database may further include an Internet protocol (IP) address, a first public IP address, a web log, or the like of the rogue AP. In addition, according to an embodiment, in the rogue AP database, information such as a global positioning system (GPS) value, OS information, vendor information, an authenticated encryption method, an accessed country, an access device, an accessed method, and the like may further be stored. However, this is merely an example, and AP-related information that may be included in the rogue AP database is not limited to those described above.

If information of the currently accessed AP 2 is not included in the rogue AP database, the user device 1 is configured to determine whether the currently accessed AP 2 is a rogue AP by further using one or more information of secure sockets layer (SSL) certificate validity information of a predetermined server, electronic signature information of an accessed web page, and media access control (MAC) address collection information of an accessed gateway.

Further, if the information of the currently accessed AP 2 is not included in the rogue AP database, the user device 1 may also determine whether the currently accessed AP 2 is a rogue AP by further using one or more information of an SSID of the AP 2, information on whether a password is set, a hop gateway address, a management page hash value, a domain name system (DNS) query response address, an operating system (OS) scan value, and information on whether it is in a promiscuous mode.

A specific process of detecting a rogue AP, by the user device 1, using the above-described respective information will be described in detail below with reference to FIG. 3.

Figure 3:
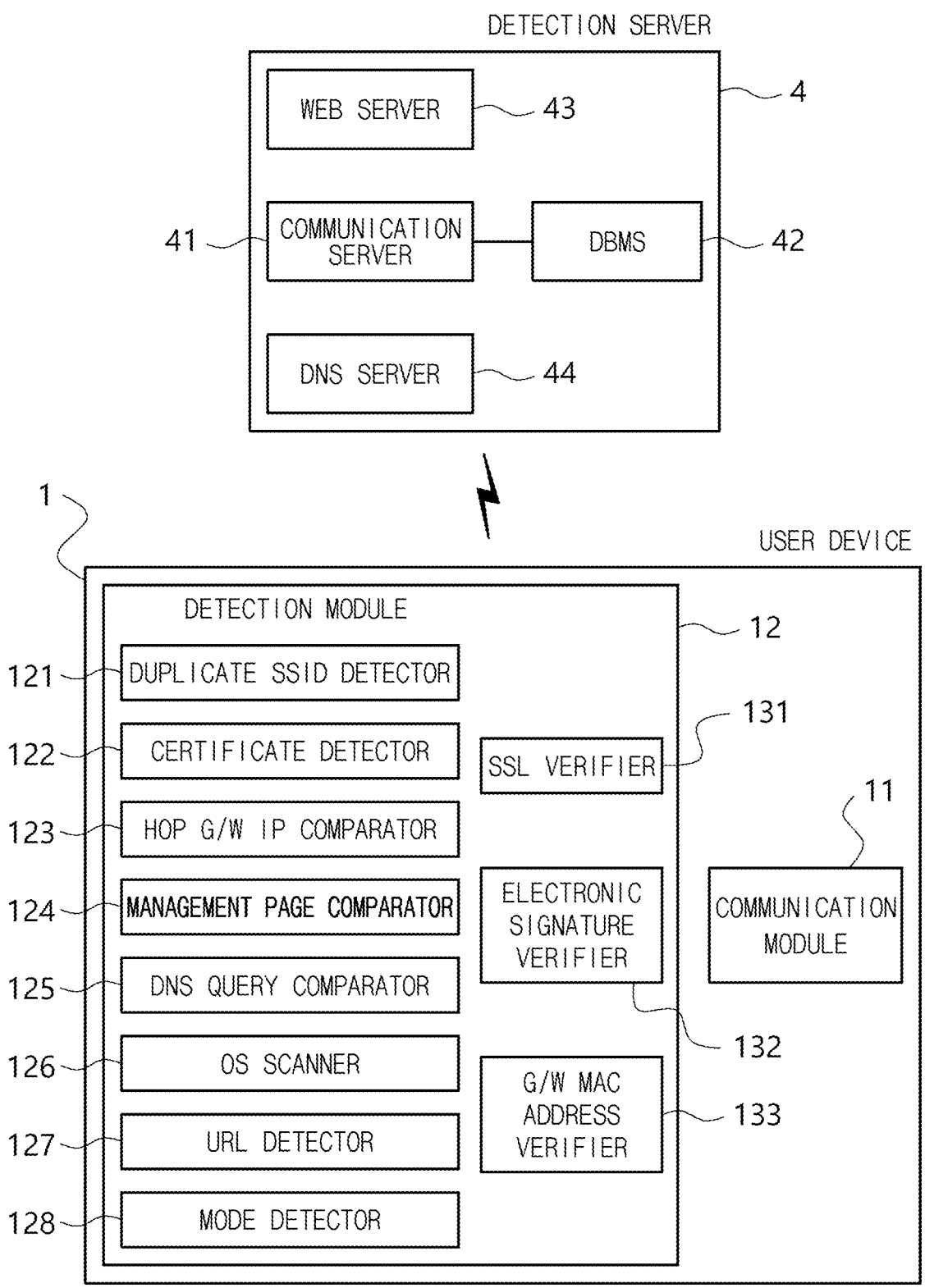
FIG. 3 is a schematic block diagram of a user device and a detection server of the system for detecting a rogue AP according to the embodiment of the present invention.

FIG. 3 is a schematic block diagram of a user device and a detection server of the system for detecting a rogue AP according to an embodiment of the present invention.

FIG. 3 illustrates that the user device 1 and the detection server 4 include a plurality of units, modules, servers, systems, etc., respectively. However, each unit, module, server, and system illustrated in the drawings are not intended to necessarily refer to separate hardware that are physically distinguished from each other, and but may correspond to conceptual division by a function performed by each device. For example, the user device 1 may be a computing device configured to implement a plurality of functions by a microprocessor and software executed by the same. However, the user device 1 is not limited thereto, for example, respective servers or systems included in the detection server 4 are configured as separate devices configured to transmit and receive data to and from each other, and the detection server 4 may refer to a device group including such devices.

Referring to FIG. 3, according to an embodiment, the detection server 4 includes a communication server 41, a database management system (DBMS) 42, and a web server 43. The DBMS 42 generates and stores a rogue AP database. The communication server 41 performs a function of transmitting the rogue AP database stored in the DBMS 42 to the user device 1, and/or storing the rogue AP database received from the user device 1 in the DBMS 42. The web server 43 is a server for access of a plurality of devices including the user device 1, and is intended as being a concept including a web application server (WAS) if needed.

According to embodiments of the present invention, the web server 43 and the DBMS 42 are configured to generate a rogue AP database at least partially based on URL access detection. Specifically, all of client devices for the detection server 4, including the user device 1, are configured to attempt to access the web server 43 using a one-time URL corresponding to the respective devices.

For example, in the URL through which the device attempts to access the web server 43 may include [corresponding device information], [a random value], and [information of the AP to which the device accesses]. The random value is an arbitrary number and/or character string so as to prevent one-time URLs from being overlapped with each other. The device information included in the URL is a unique value given to the corresponding device, and may be an IP address or an MAC address. Further, the information of the AP included in the URL may be an IP address, an MAC address, an SSID and/or a BSSID, or the like, but it is not limited thereto. The respective devices are configured to attempt to access the web server 43 only one time using the URL.

When the device attempts to access the web server 43 using the URL, a page corresponding to the URL does not exist in the web server 43, but access log information due to the access attempt is generated in the web server 43. The DBMS 42 of the detection server 4 generates a URL access detection-based rogue AP database on the basis of the access log information.

For example, the DBMS 42 may specify a rogue AP by searching multiple access attempts using the same URL in the access log. Since the URL used in the above process is a one-time URL, if there are multiple access attempts using the one-time URL, it may be inferred that the second and subsequent access attempts are made by the rogue AP that intercepts the URL from the user device 1. Further, the DBMS 42 further searches whether there are access attempts using the same URL at different devices or locations (that is, IP address) and determines that the second and subsequent access attempts using the same URL are made by a rogue AP, thereby specifying the rogue AP.

The communication server 41 transmits the URL access detection-based rogue AP database that is generated by the above described process to the user device 1 to allow the user device 1 to search whether the currently accessed AP or the AP to be accessed is a rogue AP based on the rogue AP database.

Meanwhile, according to an embodiment, the web server 43 receives a URL including information of the AP to which the user device 1 accesses from a URL detector 127 of the user device 1, and analyzes a web log for the corresponding URL to check whether there is a URL access from an attacker. If there is a URL access from the attacker, the web server 43 transmits information indicating that the AP corresponding to the received URL is a rogue AP to the communication server 41. Thereafter, the communication server 41 may update the rogue AP database of the DBMS 42 so as to add the corresponding AP, and transmit the updated rogue AP database to the user device 1.

According to an embodiment, the detection server 4 further includes a DNS server 44. The DNS server 44 has a predetermined domain and an IP address, and the IP address of the DNS server 44 is transmitted in advance to a DNS query comparator 125 of the user device 1. Thereafter, when the user device 1 transmits a query to the domain of the DNS server 44 through the accessed AP, if the accessed AP is a rogue AP, an IP address different from an actual IP address of the DNS server 44 will be transmitted as a response, and through this, the DNS query comparator 125 may detect that the currently accessed AP is a rogue AP.

According to an embodiment, the user device 1 includes a communication module 11 and a detection module 12. The communication module 11 accesses an AP (not illustrated) providing a wireless LAN signal, and also provides a function that the user device 1 may transmit and receive data to and from the detection server 4 through the AP. For example, the communication module 11 may include a Wi-Fi module provided in a mobile device such as a smartphone, a tablet PC, or the like, or a wireless LAN card provided in a PC or a notebook computer.

The detection module 12 may detect whether the AP to which the user device 1 accesses is a rogue AP with reference to the rogue AP database. Further, if information of the currently accessed AP is not included in the rogue AP database, it is possible to determine whether the currently accessed AP is a rogue AP by further using one or more information of SSL certificate validity information of a specific server, electronic signature information of an accessed web page, and MAC address collection information of an accessed gateway.

To this end, the detection module 12 according to an embodiment further includes one or more of an SSL verifier 131, an electronic signature verifier 132, and a gateway MAC address verifier 133.

The SSL verifier 131 attempts SSL connection to the specific server designated in advance in a state in which the user device accesses the AP. When the SSL connection fails, the SSL verifier 131 may determine that the currently accessed AP is a rogue AP. When the SSL connection succeeds, the SSL verifier 131 verifies SSL certificate validity of the connected server, and if the SSL certificate is not valid even though the SSL connection succeeds, may determine that the currently accessed AP is a rogue AP. A specific process of verifying SSL certificate validity may be performed through communication with a certification authority, and is well known in the art, therefore will not be described in detail.

The electronic signature verifier 132 stores a specific web page address and an electronic signature corresponding thereto in advance. In a state in which the user device accesses the AP, the electronic signature verifier 132 downloads the specific web page and checks whether the web page is forged by checking whether the electronic signature of the downloaded web page coincides with the electronic signature stored in advance. If the electronic signatures do not coincide with each other, the electronic signature verifier 132 may determine that the currently accessed AP is a rogue AP. The electronic signature may be formed in various forms, for example, may be obtained by putting a signature on a secure hash algorithm (SHA)-256 hash value by a Rivest Shamir Adleman (RSA) algorithm, but it is not limited thereto. Further, the electronic signature may also be stored by being encoded by base 64 encoding.

The gateway MAC address verifier 133 is a portion for detecting an address resolution protocol spoofing attack. The gateway MAC address verifier 133 collects an MAC address of a gateway to which the user device accesses multiple times periodically and/or aperiodically after executing an application (or an app) for rogue AP detection on the user device. For example, the gateway MAC address verifier 133 may collect MAC addresses of devices in a broadcasting domain affecting a transmission and reception packet of the user device from an ARP cache table of the user device. In a state in which there is no network attack, the MAC addresses of the devices collected as described above need to be different from each other. Accordingly, the gateway MAC address verifier 133 may collect the MAC address of the gateway in a state in which the user device accesses the AP, and determine that the currently accessed AP is a rogue AP if a plurality of same MAC addresses are collected in the broadcasting domain.

If information of the currently accessed AP is not searched in the rogue AP database, the detection module 12 may autonomously determine whether the currently accessed AP is a rogue AP by further using one or more of detection results obtained by the respective units 131 to 133 described above.

Further, the detection module 12 may determine whether the currently accessed AP is a rogue AP by further using one or more information of an SSID of the AP to which the user device 1 accesses, information on whether a password is set, a hop gateway address, a management page hash value, a DNS query response address, an OS scan value, and information on whether it is in a promiscuous mode.

To this end, according to an embodiment, the detection module 12 further includes one or more of a duplicate SSID detector 121, a certificate detector 122, a hop gateway IP comparator 123, a management page comparator 124, a DNS query comparator 125, an OS scanner 126, a uniform resource locator (URL) detector 127, and a mode detector 128.

The duplicate SSID detector 121 detects whether there is a duplicate of the SSID of the currently accessed AP among SSIDs of APs around the user device 1. If there is an AP with the duplicate SSID while having the same BSSID, it may be determined that the corresponding AP is highly likely a rogue AP.

The certificate detector 122 detects whether a password is set in the AP to which the user device 1 is currently accessed. In the case of the AP in which the password is not set, it may be determined that the AP is highly likely a rogue AP.

The hop gateway IP comparator 123 collects hop gateway IP addresses of APs around the user device 1 using network diagnosis through traceroute, and if there is an AP with three same hop gateway IPs among the collected hop gateway IP addresses, it may be determined that the AP is highly likely a rogue AP.

The management page comparator 124 stores, when the user device 1 first accesses a specific AP, a hash value of a management page of the corresponding AP, and detects whether the hash value of the management page is the same as the pre-stored hash value when the user device 1 accesses the corresponding AP again later. When the hash value of the management page is changed, it may be determined that the AP is highly likely a rogue AP. According to an embodiment, the hash value stored in the management page comparator 124 may also be configured to be automatically deleted after a predetermined period (for example, 15 days) elapses.

The DNS query comparator 125 may receive and store a predetermined IP address for the DNS server from the detection server 4, and may receive a predetermined query response IP address for the DNS server with being connected to the AP to be detected, to detect whether the received IP address is the same as the pre-stored IP address. If the query response address for the DNS server is different from the pre-stored IP address, it may be determined that the AP to which the user device 1 is currently accessed is a rogue AP.

The OS scanner 126 receives a type of OS to which the user device 1 is currently accessed as a scan value. When the scanning result is Kali linux or Backtrack, or the scanning is impossible, it may be determined that the currently accessed AP is highly likely a rogue AP.

The URL detector 127 may generate a URL including information of the AP to which the user device 1 is currently accessed, and information of the user device 1, transmit the generated URL to the detection server 4, and receive a result of detecting, by the detection server 4 using the URL, whether the AP to which the user device 1 is currently accessed is a rogue AP from the detection server 4. If the AP to which the user device 1 accesses is a rogue AP, when the attacker accesses the corresponding URL, the access history remains as a web log for the URL. Further, user-agent information of the attacker remains in the web log. Therefore, by analyzing the web log for the URL by the detection server 4, the user device 1 may determine whether the AP associated to the corresponding URL is a rogue AP.

The mode detector 128 detects whether the AP to which the user device 1 is currently accessed communicates in a promiscuous mode. When the AP is in the promiscuous mode, it may be determined that the AP is highly likely a rogue AP. The detection module 12 may autonomously determine whether the currently accessed AP is a rogue IP by further using one or more of the detection results obtained by respective units 121 to 128 described above. For example, if an IP obtained as a query response IP for the predetermined DNS server by the DNS query comparator 125 is different from an IP of the DNS server that is previously set, it may be determined that the currently accessed AP is a rogue AP. Further, as a result of generating and transmitting, by the URL detector 127, the URL including information of the AP and information of the user device 1, if access to the corresponding URL is performed two or more times, it may be determined that the AP to which the user device 1 currently accesses is a rogue AP. Alternatively, when the mode detector 128 detects that the currently accessed AP is in the promiscuous mode, it may be determined that the currently accessed AP is a rogue AP.

According to an embodiment, the detection module 12 converts the detection results obtained by each of the duplicate SSID detector 121, the certificate detector 122, the hop gateway IP comparator 123, the management page comparator 124, and the OS scanner 126 into a rogue AP diagnosis score according to a predetermined conversion rule, and compares a sum of the respective converted rogue AP diagnosis scores with a predetermined threshold value, thereby determining whether the currently accessed AP is a rogue AP.

For example, (i) in a case in which there are the same BSSID as that of the currently accessed AP and a duplicate SSID, (ii) in a case in which a password is not set for the AP, (iii) in a case in which the same three hop gateway IPs are detected, (iv) in a case in which a hash value of a management page of the AP is changed from before, and (v) in a case in which an OS scan value is Kali linux or Backtrack, or the OS detection is impossible, rogue AP diagnosis scores of (i) 30 points, (ii) 20 points, (iii) 50 points, (iv) 20 points, and (v) 40 points may be applied to the respective cases. If there is a case that does not satisfy the above-described conditions among the cases of (i) to (v), a score of 0 point is applied to the corresponding case. The rogue AP diagnosis scores applied to the cases of (i) to (v) as described above are summed, and if the summed result exceeds 70 points which is a threshold value, it may be determined that the currently accessed AP is a rogue AP by the detection module 12. However, this is merely an example, thus a conversion method for integrating results for each condition and a threshold value of the rogue AP score are not limited to those described above.

When a specific AP is determined as a rogue AP by the above described process, the detection module 12 of the user device 1 adds information (for example, SSID or BSSID, etc.) of the corresponding AP to the rogue AP database to update the rogue AP database. Further, the communication module 11 of the user device 1 transmits the updated rogue AP database to the detection server 4, so that the rogue AP database of the detection server 4 is also updated.

Figure 4:
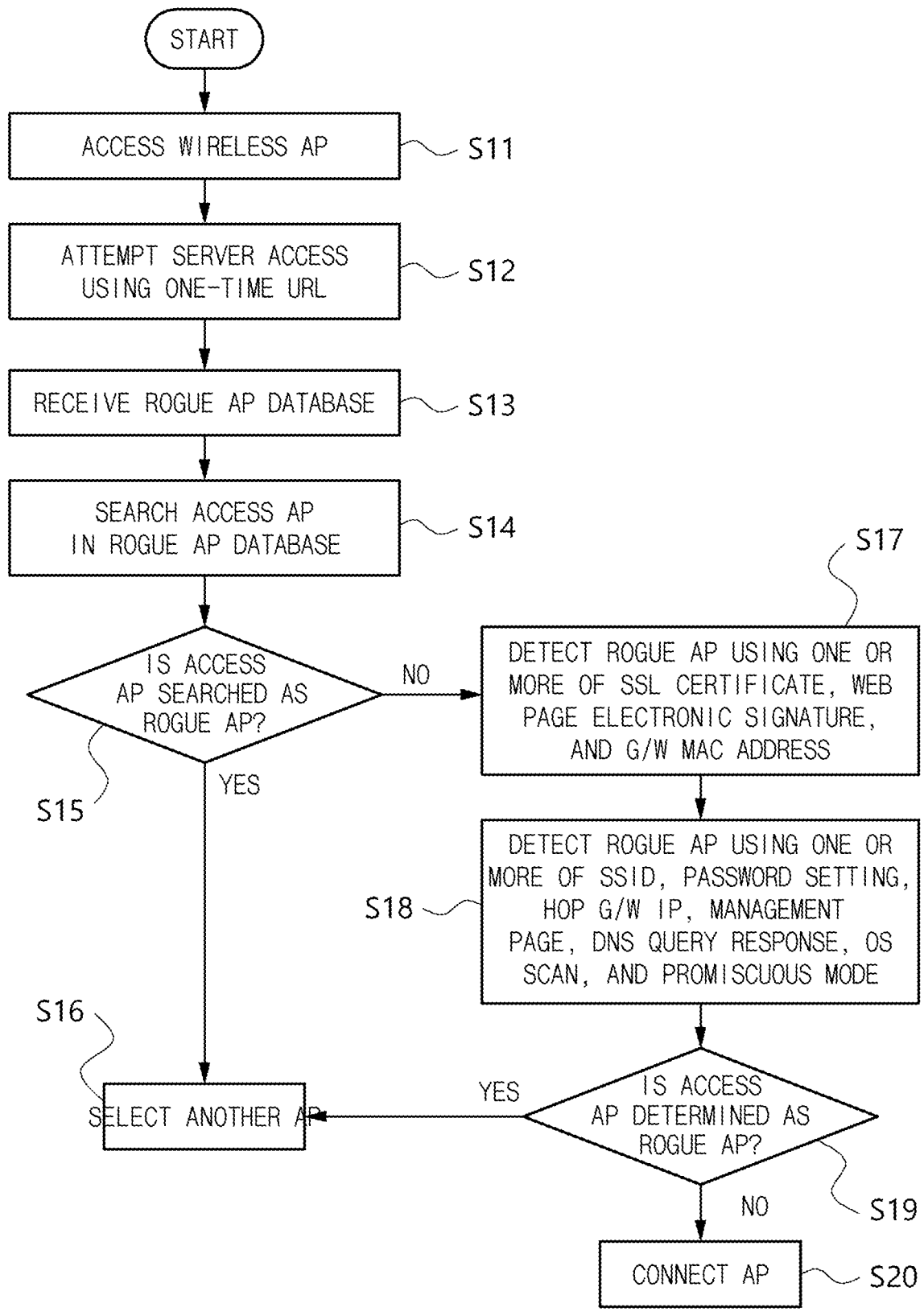
FIG. 4 is a flowchart of a method for detecting a rogue AP according to an embodiment of the present invention.

FIG. 4 is a flowchart of a method for detecting a rogue AP according to an embodiment, and the method for detecting a rogue AP illustrated in FIG. 4 corresponds to an operation performed on the user device.

Referring to FIG. 4, first, the user device may access a wireless AP (S11). The access to the wireless AP may be automatically performed on the user device, or may be manually performed by a selection of the user. Further, if there is a record of access by the user device to the corresponding wireless AP in the past, the user device may also automatically access the corresponding AP, after the corresponding wireless AP becomes available.

The user device attempts access to the detection server using a one-time URL including information of the user device and information of the wireless AP to which the user device accesses so that a rogue AP database based on URL access detection may be generated in the detection server (S12). The detection server may generate the rogue AP database through the access log information using the one-time URL.

FIG. 4 illustrates that the access attempt process (S12) for generating the access log is performed right after the AP access process (S11), but this is merely an example, and the access attempt process (S12) for generating the access log may also be performed in any other order.

The user device may receive the rogue AP database by accessing the detection server (S13). For example, the rogue AP database may be received in response to execution of an application (or app) for detecting a rogue AP after the user accesses the wireless AP. Alternatively, the user device may be configured in such a way that the application (or app) for detecting a rogue AP is automatically executed, when the user device accesses the wireless AP.

In the present embodiment, receiving a rogue AP database (S13) is described as a first process of detecting a rogue AP. However, this is merely an example, and in other embodiments, the receiving of the rogue AP database may also be performed periodically and/or aperiodically regardless of whether to execute the rogue AP detection. For example, the receiving of the rogue AP database may also be automatically performed in background without a separate input by the user in the user device.

In the method for detecting a rogue AP according to an embodiment, detecting whether network connection through the AP is normally made (not illustrated) may be further performed before starting the process of detecting a rogue AP. For example, if a predetermined query signal is transmitted to the detection server through the wireless AP and a response signal for the query signal is received from the detection server, it is determined that the network connection is normally made, and the user device may start the subsequent process of detecting a rogue AP.

Next, the user device may detect whether the currently accessed AP is a rogue AP by searching the currently accessed AP in the rogue AP database (S14). The rogue AP database includes SSIDs and/or BSSIDs of APs determined as the rogue AP, and the user device may detect whether the currently accessed AP is a rogue AP by searching an SSID or a BSSID of the currently accessed AP in the rogue AP database.

As a result of searching, if the currently accessed AP is included in the rogue AP database (S15), the user device is configured so as to select other AP without accessing the rogue AP (S16). The selection of other AP may be automatically performed by the user device. Alternately, the user device may also be configured in such a way that the user directly selects other AP by displaying a user interface to promote the selection of other AP in the user device.

Meanwhile, as a result of searching (S15), if the currently accessed AP is not included in the rogue AP database, it is possible to determine whether the AP to which the user device currently accesses is a rogue AP by further using one or more information of SSL certificate validity information of a predetermined specific server, electronic signature information of an accessed web page, and MAC address collection information of a gateway (S17).

Further, according to an embodiment, the user device may determine whether the AP to which the user device currently accesses is a rogue AP by further using one or more information of an SSID of the accessed AP, information on whether a password is set, a hop gateway address, a management page hash value, a DNS query response address, an OS scan value, and information on whether it is in a promiscuous mode (S18).

The process of detecting, by the user device, a rogue AP using the above described information is the same as in the embodiment described with reference to FIG. 3, and therefore will not be described in detail to avoid overlapped description.

As a detection result by steps S17 and S18, if it is determined that the currently accessed AP is a rogue AP (S19), the user device is configured so as to select other AP without accessing the rogue AP (S16). Meanwhile, as a detection result by steps S17 and S18, if it is determined that the currently accessed AP is not a rogue AP (S19), the user device maintains connection to the corresponding AP so as to allow the user to access the network through the corresponding AP (S20).

Figure 5:
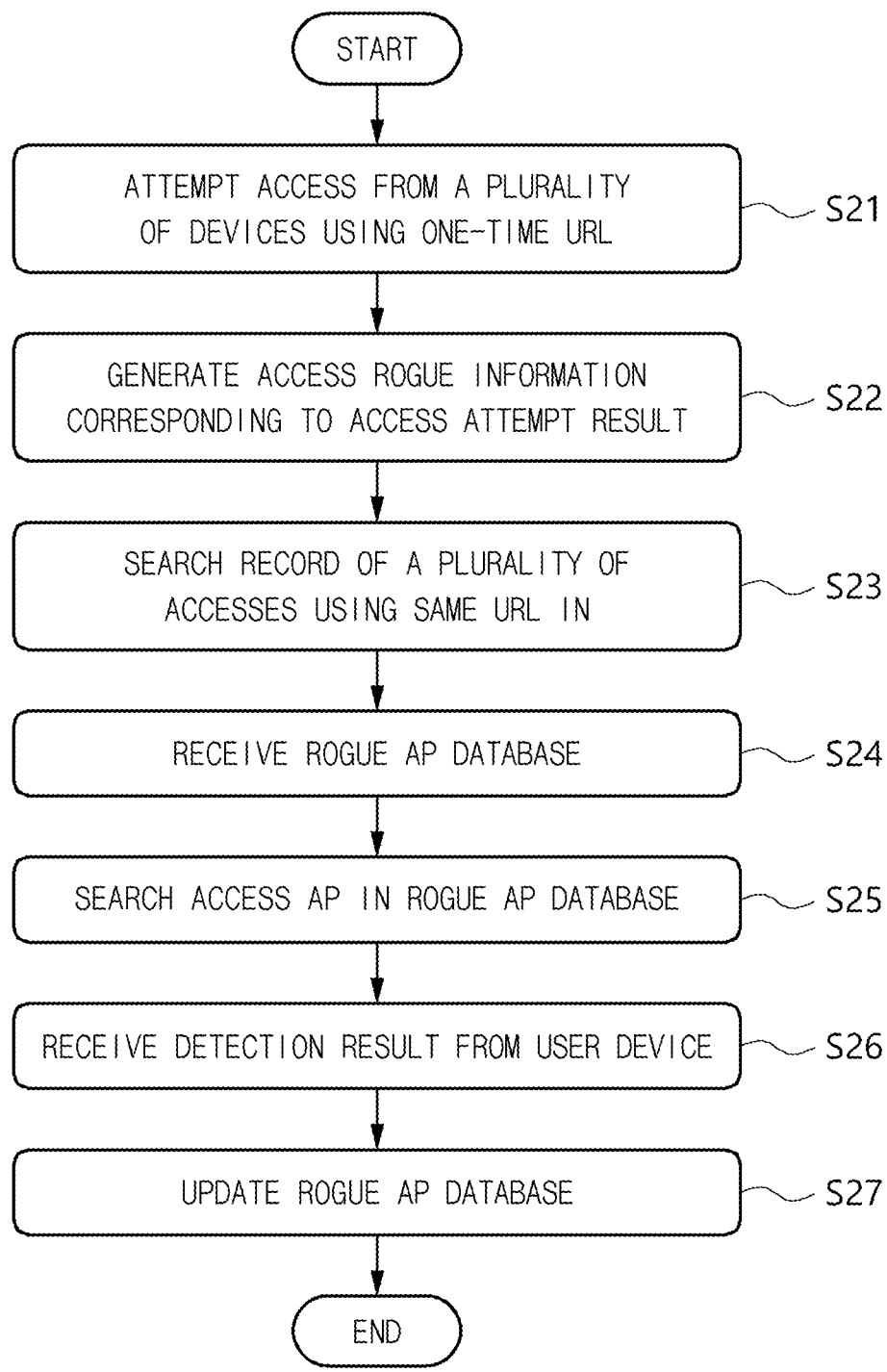
FIG. 5 is a flowchart of a method for detecting a rogue AP according to another embodiment of the present invention.

FIG. 5 is a flowchart of a method for detecting a rogue AP according to another embodiment, and the method for detecting a rogue AP illustrated in FIG. 5 corresponds to an operation performed on the detection server.

Referring to FIG. 5, first, the detection server may receive an access attempt using a one-time URL from a plurality of devices to generate a URL access detection-based rogue AP database (S21). At this time, the URL used for the access attempt includes information of the device attempting access and information of the AP to which the corresponding device accesses.

Since a page corresponding to the one-time URL does not exist in the detection server, access itself is not normally performed. However, access log information corresponding to an access attempt result is generated in the detection server (S22). The detection server may generate a URL access detection-based rogue AP database on the basis of the access log information.

For example, the detection server searches a record of a plurality of accesses using the same one-time URL in the access log (S23), and if there are a plurality of access attempts by different devices and/or in different locations using the same one-time URL, determines that the URL is taken by a rogue AP and generates a rogue AP database to define a rogue AP using information included in the corresponding URL (S24).

Next, the detection server transmits the generated rogue AP database to the user device (S25). In the transmission process, the whole rogue AP database may be generated by the detection server and transmitted to the user device, or a data set generated based on the URL access detection in a state in which the rogue AP database already exists in the user device may be transmitted to the user device.

According to an embodiment, the detection server is further configured to receive a detection result for the rogue AP from the user device (S26), and update the rogue AP database of the detection server based on the received information (S27). The detection result received from the user device may be a detection result obtained based on SSL certificate validity information of a specific server, electronic signature information of an accessed web page, and/or MAC address collection information of an accessed gateway. Further, the detection result received from the user device may also be a detection result obtained by further using one or more information of an SSID of the AP, information on whether a password is set, a hop gateway address, a management page hash value, a DNS query response address, an OS scan value, and information on whether it is in a promiscuous mode.

The operation by the method for detecting a rogue AP according to the embodiments as described hereinabove may be implemented, at least in part, as a computer program and recorded in a computer-readable recording medium. The computer-readable recording medium for recording the program for implementing the operation by the method for detecting a rogue AP according to the embodiments includes any type of recording device in which computer-readable data is stored. Examples of the computer-readable recording medium include ROM, RAM, CD-ROM, magnetic tape, floppy disks, and optical data storage devices. Furthermore, the computer-readable recording medium may be distributed over computer systems connected via a network, to store and execute computer-readable codes in a distribution fashion. Additionally, functional programs, codes and code segments for implementing this embodiment will be easily understood by person having ordinary skill in the technical field to which this embodiment belongs.

While the present disclosure has been described hereinabove with reference to the embodiments shown in the drawings, this is for illustration only, and it will be apparent to person having ordinary skill in the art that various modifications and variations in the embodiments may be made thereto. However, it should be understood that such modifications fall within the technical scope of protection of the present disclosure. Therefore, the true technical scope of protection of the present disclosure should be defined by the technical spirit of the appended claims.

The invention claimed is:

1. A system for detecting a rogue access point (AP) comprising:
a user computer device configured to detect whether an accessed AP is a rogue AP with reference to a rogue AP database based on uniform resource locator (URL) access detection, and, in response to determining that information of the accessed AP is not searched in the rogue AP database, to determine whether the accessed AP is a rogue AP by further using one or more information of secure sockets layer (SSL) certificate validity information of a predetermined server, electronic signature information of an accessed web page, and media access control (MAC) address collection information of an accessed gateway; and
a detection server configured to share the rogue AP database with the user device,
wherein the user device is further configured to attempt access to the detection server only one time using a onetime URL, wherein the onetime URL comprises information of the user device, a random value, and information of the AP to which the user device accesses for generation of the rogue AP database,
wherein a web page corresponding to the onetime URL does not exist in the detection server,
wherein the detection server is further configured to generate the rogue AP database based on access log information generated by attempts of access to the detection server using the onetime URL, by searching attempts of access made by different devices or in different locations among a plurality of attempts of access using the onetime URL, and by determining the information of the AP in the onetime URL as information of a rogue AP when the onetime URL was used in more than one attempts of access made by different devices or in different locations,
wherein the user device comprises a detection module configured to detect whether the accessed AP is a rogue AP with reference to the rogue AP database, and wherein the detection module further comprises:
- an SSL verifier configured to attempt SSL connection to a predetermined server, determine that the accessed AP is a rogue AP when the SSL connection fails, and, when the SSL connection succeeds, to verify an SSL certificate of the predetermined server and to determine that the accessed AP is a rogue AP when the SSL certificate is not valid;
- an electronic signature verifier configured to store an address of a predetermined web page and an electronic signature corresponding to the predetermined web page, to download the predetermined web page, and to determine that the accessed AP is a rogue AP when an electronic signature of the downloaded predetermined web page does not coincide with the electronic signature stored in the electronic signature verifier; and
- a gateway MAC address verifier configured to collect, from devices within a broadcasting domain affecting a transmission and reception packet of the user device, MAC addresses of gateways to which the devices access, and determine that the accessed AP is a rogue AP if a plurality of same MAC addresses are collected within the broadcasting domain.

* * * * *